(12) United States Patent
Opperman et al.

(10) Patent No.: US 10,679,295 B1
(45) Date of Patent: Jun. 9, 2020

(54) METHOD TO DETERMINE SUPPORT COSTS ASSOCIATED WITH SPECIFIC DEFECTS

(71) Applicant: EMC IP Holding Company LLC, Hopkinton, MA (US)

(72) Inventors: Mark Opperman, Paris (FR); Ryan Montgomery, Wake Forest, NC (US); Eric Schnegelberger, Youngsville, NC (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 670 days.

(21) Appl. No.: 15/282,756

(22) Filed: Sep. 30, 2016

(51) Int. Cl.
*G06Q 10/10* (2012.01)
*G06Q 40/08* (2012.01)
*G06F 16/242* (2019.01)

(52) U.S. Cl.
CPC ........... *G06Q 40/08* (2013.01); *G06F 16/242* (2019.01)

(58) Field of Classification Search
CPC .............................. G06Q 10/10; G06Q 40/08

USPC ........................................................... 705/4
See application file for complete search history.

(56) References Cited

U.S. PATENT DOCUMENTS

| 7,904,319 | B1 * | 3/2011 | Whear ................. G06Q 40/08 705/4 |
| 2011/0067006 | A1 * | 3/2011 | Baker ................. G06F 11/3604 717/127 |

* cited by examiner

*Primary Examiner* — Hai Tran
(74) *Attorney, Agent, or Firm* — Womble Bond Dickinson (US) LLP

(57) ABSTRACT

Case analysis is provided in which costs are associated with case information such as service request data. A description of defect classifications may be defined using keywords and attributes. A database query is generated based on the description of defect classifications to classify case information by problem type to a domain and a component. The description of defect classifications may be applied to a result of the database query to perform problem classification analysis. A cost analysis may be performed by problem group based at least on the case information associated with cost information and the result of the database SQL query.

21 Claims, 3 Drawing Sheets

METHOD TO DETERMINE SUPPORT COSTS ASSOCIATED WITH SPECIFIC DEFECTS

FIELD

One aspect of the disclosure herein generally relates to case analysis, and particularly relates to costs associated with service requests and other case related information in a case analysis system.

BACKGROUND

Case analysis systems and applications help an enterprise manage its business processes by providing a computer-based framework for collecting, tracking, storing and analyzing business process information. For example, a case analysis application can assist the enterprise to collect and analyze case information (data) associated with any service-based process including a loan application process, an insurance claim process, and the like. In some cases, the case analysis application can also support data searching services that allow an end-user to search for and to retrieve case analysis data and/or non-enterprise related information relevant to performing a process task. The application can be referred to as a case analysis application.

Typically, the case analysis application is customized to the enterprise's business process. Building such an application is complex and typically requires skilled programmers to write customized code to handle various phases of the enterprise's business process. Enabling search capabilities is particularly difficult because the programmers must build search queries for a variety of backend storage structures, must configure search indexing engines to build indexes based on the enterprise's specifications, and must configure document analyzers to annotate documents in the repository in order to make them searchable. Accordingly, the application building process for a case analysis application is expensive and time-consuming.

BRIEF DESCRIPTION OF THE DRAWINGS

The embodiments herein are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, in the interest of conciseness and reducing the total number of figures, a given figure may be used to illustrate the features of more than one embodiment of the invention, and not all elements in the figure may be required for a given embodiment.

DETAILED DESCRIPTION

Figure 1:
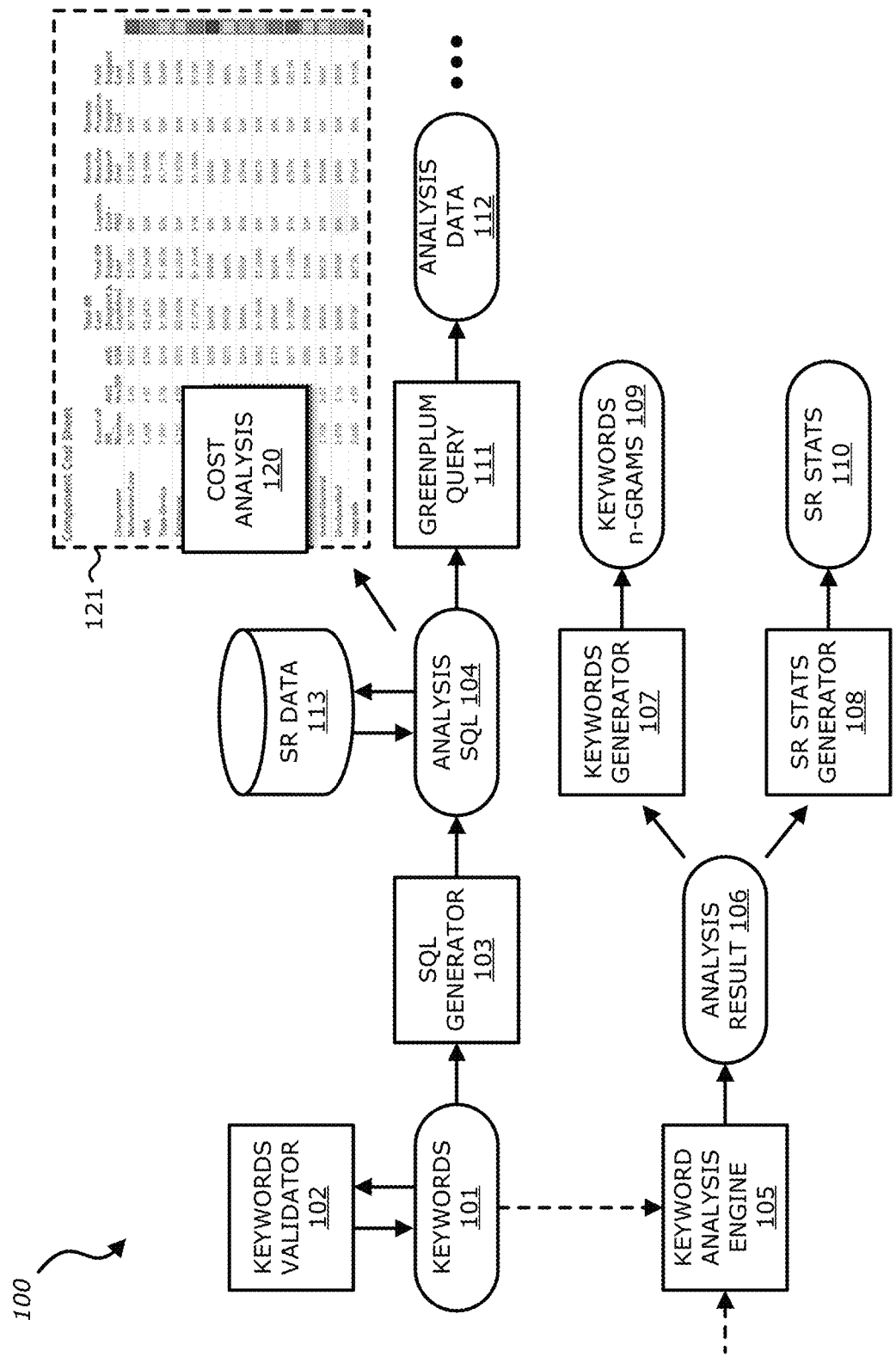
FIG. 1 illustrates a block diagram for explaining an example case analysis application according to an embodiment herein.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, it is understood that embodiments disclosed herein may be practiced without these specific details. In certain instances, well-known or conventional details, such as circuits, structures, and techniques, are not described in order to provide a concise discussion of example embodiments.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

The inventors herein have recognized that the building and implementation of case analysis applications often have limitations. For example, a case analysis system can assist in tracking product technical support costs. However, conventional case analysis applications typically provide limited cost information associated with technical support service requests or other case information. As another example, certain types of case analysis have historically been performed manually (e.g., dependent on human intervention). Data sampling, document annotation, association of knowledge base articles with specific service requests, among other things, may all be performed manually. This often results in inconsistent analyses, particularly in cases involving large amounts of case data.

Thus, for case analysis applications providing tracking of product technical support costs, current processes for reporting on technical support costs often lack a detailed breakdown and often provide limited information beyond cost allocation by product or business group. The embodiments herein generally aim to provide a case analysis system and process including problem classification and cost analysis that may be useful for any service-based organization. For example, the case analysis system may be used together with a case management system to classify incoming service requests and route them to system resources. In one embodiment, text analytics is utilized to analyze data included in each service request received by a case analysis application, such that costs associated with specific problems identified in the service request data can be determined. Text analysis is combined with detailed cost information associated with each service request to allocate costs to specific product problems. The detailed cost information associated with each service request may include, for example, information about a customer and information about technicians who have worked on the service request.

In one embodiment, a case analysis system is designed to link costs to case information (e.g., service request data), thus enabling detailed associations of cost to a specific product issue or product process issue. Case information may include service request data and ticketing data, and any other data related to cases. This case information (including costs) may also be combined with descriptions (keywords) of service request attributes associated with specific product problem types for purposes of case classification. A problem type or group may further be referred to by a hierarchy of domain and component. The keywords may be defined by a user that is considered a subject matter expert. The subject matter expert is a person having knowledge of the product and the general issues that arise in a service request. In one embodiment, text analysis is performed on the case information to determine high-frequency n-grams that can be added to the list of keywords when associated with a specific problem type. For example, in addition to being input by a user, keywords may be generated by the case analysis system itself by performing text analysis on received service requests and determining for an attribute the amount of coverage resulting from analyzing that attribute with respect to a number of service requests. The amount of coverage may be represented as a percentage or number of service requests including data matching the attribute. In one embodiment, the generated keywords are automatically added to the list of keywords if the amount of coverage meets a certain threshold. In other embodiments, the subject matter expert may review the generated keywords to determine whether they should be added to the list of keywords.

In one embodiment, the case analysis process automatically generates 1) a SQL (structured query language) query to extract cost information associated with service requests by problem type, and 2) R code to create an 'analysis' spreadsheet with service request details by problem type, including the associated keywords used to classify each service request.

Thus, the embodiments herein provide a case analysis application and method for classifying the cause of defects in a software or hardware product and in product support processes, for allocating the total costs of providing customer support in response to a service request by defect classification or attribute (e.g., direct labor, time, parts, logistics, dispatch information, etc), and for automatically prioritizing initiatives that will have the greatest effect on product margin and revenue. In this way, it is possible to identify the most costly product problems, as well as the most frequent product problems. This information can be used to identify cost drivers, improve margins, prioritize product improvements, and optimize support processes.

Turning to FIG. 1, FIG. 1 illustrates a block diagram for explaining an example case analysis application 100 according to an embodiment herein. Generally, according to the embodiment of FIG. 1, to classify service requests into a hierarchy including domain and component, different parts of the service request data are viewed as attributes of the data and rules are assigned to the attributes. The rules can be defined using regular expressions such that that they can be very general. As one example of a rule, if an attribute is found in a service request (e.g., a character string defined in the attribute matches a string found in the service request data), the service request is classified to a certain domain and component. The combination of being able to have one or multiple attributes and rules to define what those attributes look like, provides for automatic generation of a database query that will classify the service requests. This is facilitated by using an file having a human-readable format (e.g. text). Any format that is capable of being read by a human is suitable. As one example, the file may be a Microsoft Excel file. The human-readable file is processed to generate the database query. At the same time, the human-readable file is processed to generate an analysis of the rules to show the subject matter expert which service requests were classified to which domain and component and the rule that caused the service request to be classified in that way.

In more detail, referring to FIG. 1, Keywords 101 is a file including a human readable description of defect classifications using keywords and attributes. The keywords may be defined by a subject matter expert. In one embodiment, the description (rule) uses regular expressions and is defined using a human-readable file. In one embodiment, the subject matter expert assigns rules to an attribute, and the rules are also included in Keywords 101. The rules may be defined using regular expressions and may define a classification of the attribute to a particular domain or component in the hierarchy. One example of keywords 101 is provided as follows:

keywords (the characters "< >" separate columns):
domain< >component< >attribute< >case_sensitive< >regexpr
Administrative< >Duplicate< >resolution< >no< >(?=.*(sr-|aggr))(?=.*([0-9]){8})
Hardware< >Data Mover< >errcode< >yes< >^500$
Connectivity< >ESRS< >probres< >no< > (?=.*remote.*connection)(?=.*(refused|config|test|setup|issue|check))

With respect to definition by the subject matter expert, this process may initially be performed to design and build the case analysis application. The subject matter expert may also intervene at later stages, such as during implementation of the case analysis application during receipt of service requests, in order to modify the keywords or rules included in Keywords 101. Thus, input by the subject matter expert may be iterative in some cases. This may be especially useful in cases where a new issue is raised or a large number of service requests are received from a particular domain and component. In the latter case, the service request data may be analyzed for more other attributes and new keywords and new rules may be defined. In addition, an existing rule may be broken into a number of more precise rules. Since Keywords 101 is in human readable format (such as a Microsoft Excel file), a subject matter expert may easily modify the file and re-execute the case analysis application.

SR Data 113 is a database of service request data including attributes, labor, time, parts, logistics, dispatch information, and costs associated with each request. In one embodiment, SR Data 113 is a Greenplum Postgres database. In other embodiments, SR Data 113 may be any Postgres database.

Keywords Validator 102 is constructed to automatically validate the description of defect classifications included in Keywords 101 by parsing the descriptions, comparing the regular expressions for redundancy, and reporting errors. Keywords Validator 102 may analyze the keywords and rules included in Keywords 101 to determine whether the regular expressions are syntactically correct. Keywords Validator 102 may also determine whether rules are consistent with one another (e.g., override each other or otherwise invalidate each other). For example, consider the following: (the characters "< >" separate columns):

Domain< >Component< >Attr1< >Case_Sensitive1< >Regexp1
Databases< >SA P< >probres< >no< >SAP
Licensing< >Registration< >problem< >yes< >misapply In this case, the first rule is not case sensitive and will therefore also match any string including the characters "sap". These characters are also a substring of the string "misapply", and therefore the second rule will never be invoked. Accordingly, in this case, Keywords Validator 102 would determine that these rules are inconsistent and may notify the subject matter expert. The subject matter expert may then determine whether any of the rules should be modified or removed.

Keywords Validator 102 receives as input Keywords 101. Keywords Validator 102 outputs a text file indicating the validated defect classification descriptions. One example of such an output text file is as follows:

row 162: skipping rule—domain is empty
row 212: skipping rule—attr1 is empty
row 238: regexpr, "contract", impacted by an earlier regexpr on row 148, "(contract|\bCSI\b)"
row 293: regexpr, "license", impacted by another regexpr on row 293, "lice" [license]
row 316: regexpr, "(performance|latency|bottle|very slow|perf\b)", impacted by an earlier regexpr on row 277, "performance" [performance]
row 386: regexpr, "(license|licensing|licence|\bLIC\b)", impacted by an earlier regexpr on row 293, "(licence|li-cense|lice)" [license]
warning: multiple domains for component "NAS": Errors/Alerts, Storage/LUN SQL Generator 103 is constructed to automatically generate a database SQL query 104 for SR Data 113 based on the defect descriptions in Keywords 101 to classify all service requests by problem type. Cost Analysis 120 is then generated, including Component Cost Sheet 121. Component Cost Sheet 121 is a visual representation of the service request data associated with costs. Thus, each service request is classified with respect to its domain and component and each service request is linked with associated cost data. Greenplum Query 111 is also generated, which produces analysis data 112. Analysis Data 112 may include, for example, information indicating how many service requests are received in each domain and component, the rules used to classify the service requests, and how many times each rule was used. Analysis Data 112 may be used by Keyword Validator 102 to validate the keywords and to make incremental changes to the keywords as needed. Analysis Data 112 may therefore be useful to the subject matter expert in designing the case analysis application.

SQL Generator 103 receives as input Keywords 101 and outputs a Postgresql file suitable for input to SR Data 113 that will categorizes a service request based on the rules defined in Keywords 101. One example of such an output Postgresql file is as follows:
keywords (the characters "< >" separate columns):
domain< >component< >attribute< >case_sensitive< >regexpr
Administrative< >Duplicate< >resolution< >no< >'(?=.*(sr-|aggr))(?=.*([0-9]){8})'
Hardware< >Data Mover< >errcode< >yes< >'^500$'
Connectivity< >ESRS< >probres< >no< > '(?=.*remote.*connection)(?=.*refused|config|test|setup|issue|check))'
SQL:
CASE
. . .
WHEN sr.srvc_req_resoltn_sum_text~*'(?=.*(sr|aggr))(?=.*([0-9]){8})' THEN 'Administrative@Duplicate'
WHEN csrp.sr_error_code~'^500$' THEN 'Hardware@Data Mover'
WHEN (sr.srvc_req_prob_text~*'(?=.*(remote.*connection))(?=.*(refused|configtest|setup|issue|check))' OR sr.srvc_req_resoltn_sum_text~*'(?=.*(remote.*connection))(?=.*(refused|configtest|setup|issue|check))') THEN 'Connectivity@ESRS Configuration'
. . .
ELSE 'Product@Unclassified'
END AS "Problem_Group"

Keyword Analysis Engine 105 is constructed to automatically perform a problem classification analysis using the analysis data and the keywords included in Keywords 101 by applying the keywords rules to the analysis data. Keyword Analysis Engine 105 receives, as input, Keywords 101 and the query results (Analysis Data 112) after the query generated by the SQL Generator 103. Keyword Analysis Engine 105 outputs a file in human-readable format, shown as Analysis Result 106 in FIG. 1. Analysis Result 106 may have three tabs: summary, analysis, and log. In one embodiment, the summary tab shows summary data by problem group (domain and component). In one embodiment, the analysis tab shows, for each service request, its attributes and problem group along with the keyword rule that matched. In one embodiment, the log tab shows how many service requests matched each keyword rule.

Cost Analysis 120 is constructed to automatically perform a cost analysis by problem group. Cost Analysis 120 receives as input the database of service requests associated with cost information, the SQL query generated by SQL Generator 103, and a Tableau workbook definition created to visualize the results.

Keywords Generator 107 is constructed to automatically generate n-grams 109 for unclassified service requests to be added to the keywords included in Keywords 101 file. Keywords Generator 107 receives as input the Analysis Result 106 file. Using text mining, the problem summary and resolution summary of unclassified service requests are analyzed for the highest frequency n-grams to be used to refine the keywords rules included in Keywords 101. For example,

| Top 50 N-Grams from Resolution Summary | | |
|---|---|---|
| | word | freq |
| 1: | applianc custom | 2 |
| 2: | close sr | 2 |
| 3: | vxrail poc | 2 |

In one embodiment, Keyword Analysis Engine 105 analyzes any unclassified service requests. In this regard, in situations where service request data does not match any of the rules included in Keywords 101, a service request may remain unclassified. Keyword Analysis Engine 105 may automatically suggest keywords to the subject matter expert that can be used to build rules for the unclassified service request. In one embodiment, Keyword Analysis Engine 105 may determine common groups of keywords that are included in the service request data and how to generate a rule to assign a service request to a particular domain and component.

SR States Generator 108 is constructed to automatically generate coverage analysis for other service request attributes (SR Stats 110). For example, for the swfunc component:

| swfunc | count | percent |
|---|---|---|
| | 3302 | 35.87% |
| Reporting | 1373 | 14.91% |
| Collector | 816 | 8.86% |
| Configuration | 549 | 5.96% |
| Performance | 358 | 3.89% |
| Alerting | 294 | 3.19% |
| Discovery | 227 | 2.47% |

Thus, in addition to keywords being input by a user, SR States Generator 108 may be used to develop keywords to design the case analysis system. SR States Generator 108 analyzes attributes to generate the coverage analysis, which is the amount of coverage resulting from analyzing that attribute with respect to a number of service requests. The amount of coverage may be a percentage as shown above or number of service requests including data matching the attribute. In one embodiment, the generated keywords are automatically added to the list of keywords if the amount of coverage meets a certain threshold. In other embodiments, the subject matter expert may review the generated keywords to determine whether they should be added to the list of keywords.

In one embodiment, SR States Generator 108 is executed early in the keyword development process, so that the subject matter expert may use the coverage analysis in determining keywords and rules.

Figure 2:
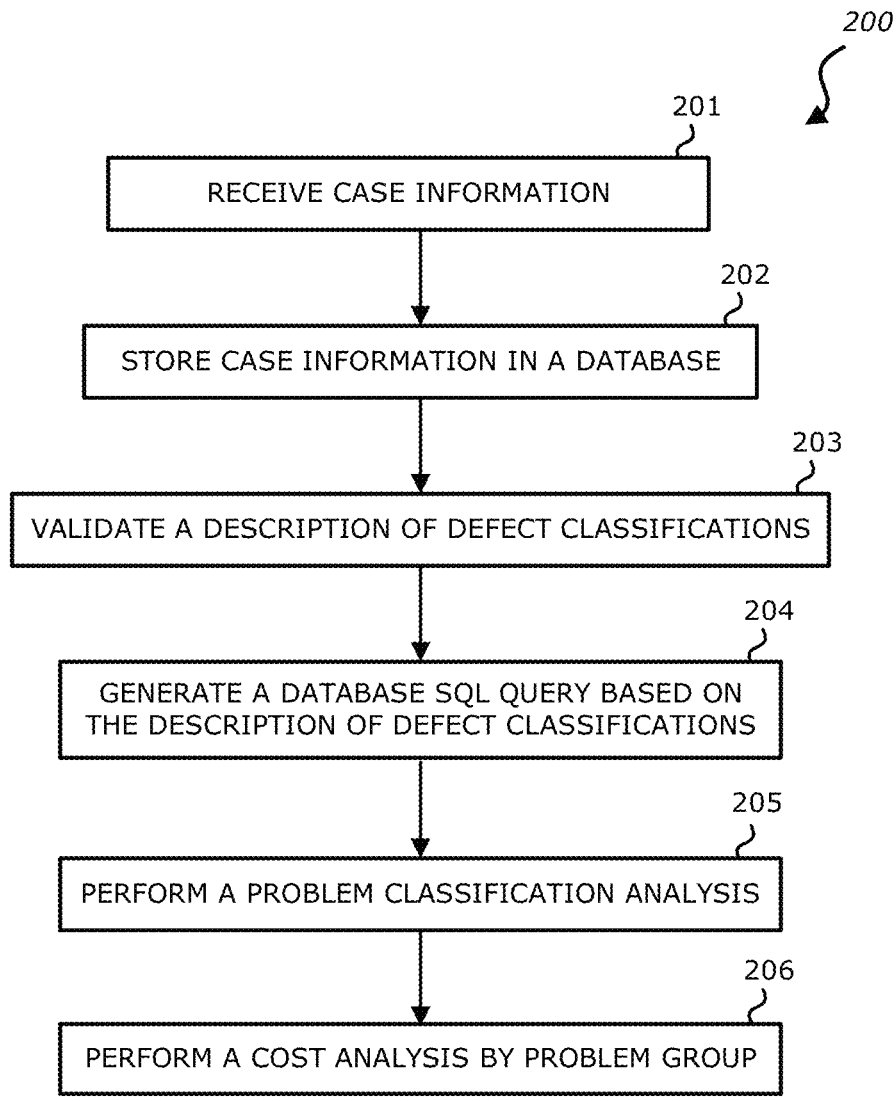
FIG. 2 illustrates a flow diagram for explaining an example process for associating a cost with a service request according to an embodiment herein.

Turning to FIG. 2, FIG. 2 illustrates a flow diagram for explaining an example case analysis process, and particularly a cost analysis process, according to an embodiment herein. In this regard, the following embodiments may be described as a process 200, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Process 200 may be performed by processing logic that includes hardware (e.g. circuitry, dedicated logic, etc.), software (e.g., embodied on a non-transitory computer readable medium), or a combination thereof.

Referring to FIG. 2, at block 201 case information such as service requests is received, and the case information is stored in a database (e.g., SR Data 113 of FIG. 1) at block 202. In other embodiments not shown by FIG. 2, blocks 201 and 202 are not performed, and the following blocks 203-206 are performed using previously stored case information. At block 203, a description of defect classifications defined using keywords and attributes (e.g., Keywords 101 of FIG. 1) is automatically validated. As previously mentioned, the description of defect classifications and the keywords included therein may be defined by a subject matter expert and may also be defined by Keyword Analysis Engine 105, Keywords Generator 107 and SR States Generator 108. At block 204, a database SQL (structured query language) query is automatically generated (e.g., by SQL Generator 103) based on the description of defect classifications to classify the case information (e.g., service request) to a domain and a component by problem type. At block 205, a problem classification analysis is automatically performed (e.g., by Keyword Analysis Engine 105) by applying the description of defect classifications of the keywords to a result of the database SQL query. At block 206, a cost analysis is automatically performed (e.g., by Cost Analysis 120) by problem group (domain and component) based at least on the stored case information (e.g., service requests) associated with cost information and the result of the database SQL query.

By virtue of the embodiments discussed herein, accuracy and repeatability when associating costs with case information (e.g., service requests) may be achieved. In this regard, once a subject matter expert defines keywords and rules, the case analysis application may be implemented automatically based on the definitions. Moreover, it is possible to achieve this accuracy and repeatability with minimal human input, thus reducing error and improving scalability. In addition, it is possible to link cost data with case information such as service request data using a SQL query, such that costs associated with a specific product issue or product process issue may be detailed and attributes of service request data may be linked to the hierarchy (domain and component). In this regard, individual cost data (e.g., costs related to labor, time, dispatch, logistics, parts), as well as total cost data, may be associated to each service request.

Furthermore, by virtue of the embodiments disclosed herein, it is typically possible to analyze a root cause of a service request, in addition to a description of the symptom of the service request. This allows for aggregation of data across different products, and correlation from product to product. For example, if an issue arises on a large number of products of a certain division or business unit, the issue may be identified and addressed, such that technical support costs may be aggregated across an entire company, or entire division of a company.

Figure 3:
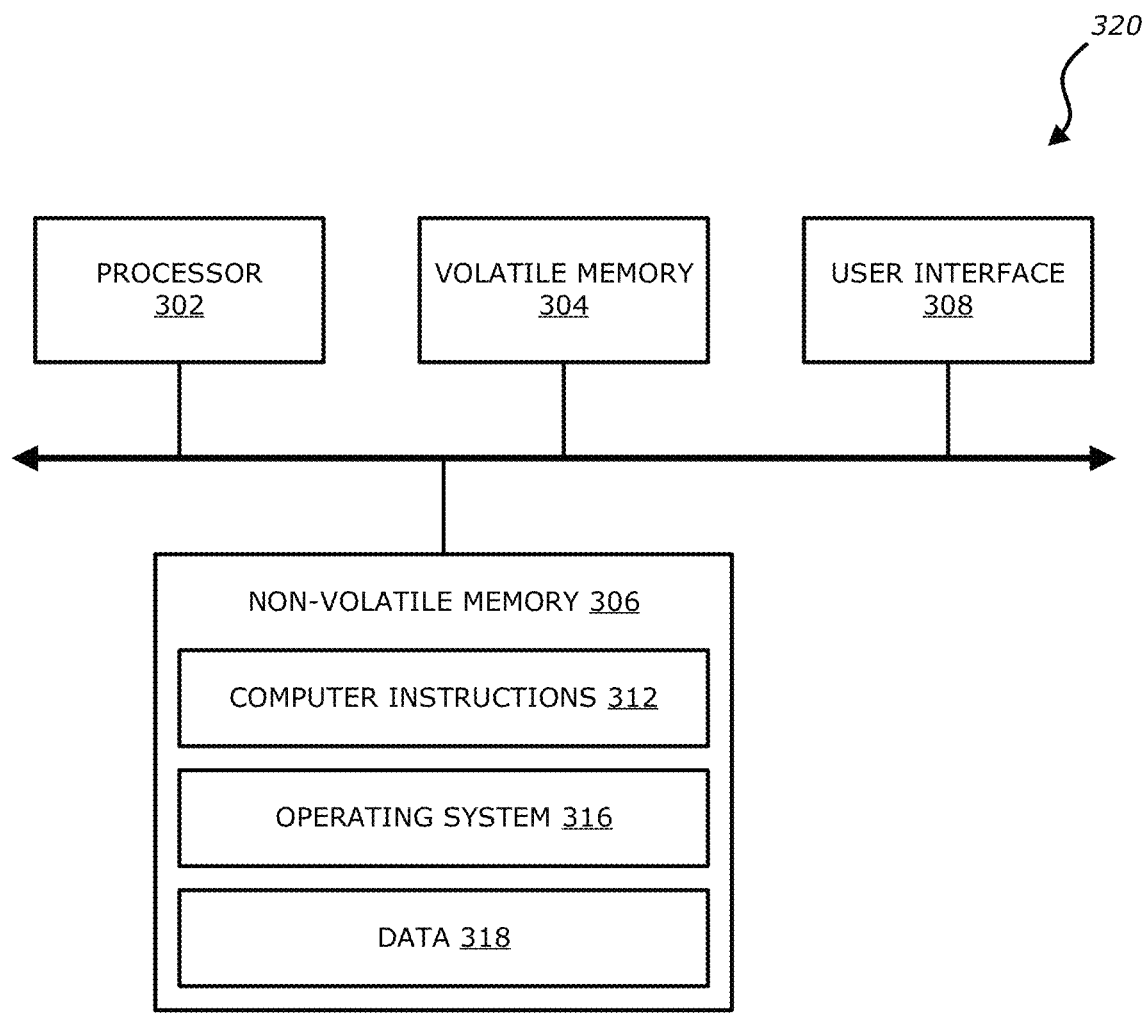
FIG. 3 illustrates a block diagram for explaining an example data processing system on which a case analysis process may be implemented according to an embodiment herein.

FIG. 3 illustrates a block diagram of an example of a case analysis system which may be used with one embodiment herein. For example, system 320 may represent any of case analysis systems described above performing any of the processes or methods described above. System 320 may include many different components that can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 320 is intended to show a high level view of many components of the computer system. However, it is to be understood that additional components may be present in certain implementations and furthermore, different arrangement of the components shown may occur in other implementations. System 320 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

System 320 includes a processor 302, a volatile memory 304, a non-volatile memory 306 (e.g., hard disk) and a user interface (UI) 308 (e.g., a graphical user interface, a mouse, a touch pad, a touch sensitive screen, a display, a pointer device such as a stylus, a keyboard, and so forth). The non-volatile memory 306 stores computer instructions 312, an operating system 316 and data 318. In one example, the computer instructions 312 are executed by the processor 302 out of volatile memory 304 to perform all or part of the processes described herein (e.g., process 200). In addition, executable code and/or data of a variety of operating systems, device drivers, firmware (e.g., input output basic system or BIOS), and/or applications can be loaded in the memory and executed by processor 302.

In one embodiment, system 320 may also include input/output devices (not shown) such as audio devices (e.g., a speaker, a microphone), universal serial bus (USB) ports, parallel ports, serial ports, a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Input/output devices may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect via a sensor hub (not shown), while other devices such as a keyboard or thermal sensor may be controlled by an embedded controller (not shown), dependent upon the specific configuration or design of system 320.

To provide for persistent storage of information such as data, applications, one or more operating systems and so forth, a mass storage (not shown) may also couple to processor 302. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 302, e.g., via a serial peripheral interface (SPI). This flash device may provide for non-volatile storage of system software, including a basic input/output software (BIOS) as well as other firmware of the system.

Processor 302 may represent a single processor or multiple processors with a single processor core or multiple processor cores included therein. Processor 302 may represent one or more general-purpose processors such as a microprocessor, a central processing unit (CPU), or the like. More particularly, processor 302 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 302 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 302, which may be a low power multi-core processor socket such as an ultra-low voltage processor, may act as a main processing unit and central hub for communication with the various components of the system. Such processor can be implemented as a system on chip (SoC).

FIG. 3 is merely one example of a particular implementation and is merely intended to illustrate the types of components that may be present in the system 320. Note that while system 320 is illustrated with various components of a case analysis system, it is not intended to represent any particular architecture or manner of interconnecting the components; as such details are not germane to embodiments of the present invention. It will also be appreciated that network computers, handheld computers, mobile phones, servers, and/or other case analysis systems which have fewer components or perhaps more components may also be used with embodiments herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes described herein (e.g., process 200) are not limited to use with the hardware and software of FIG. 3; they may find applicability in any computing or processing environment and with any type of machine or set of machines that is capable of running a computer program. The processes described herein may be implemented in hardware, software (including computer code stored on a computer-readable medium, such as a hard drive or system memory), or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable storage medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se. The terms "computer-readable storage medium" and "machine-readable storage medium" shall also be taken to include any medium that is capable of storing or encoding a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, and optical and magnetic media, or any other non-transitory machine-readable medium. The terms "computer-readable storage medium" and "machine-readable storage medium" should be taken to include a single medium or multiple media (e.g., a centralized or distributed database, and/or associated caches and servers) that store the one or more sets of instructions.

The processes described herein are not limited to the specific examples described. For example, process 200 is not limited to the specific processing order of FIG. 2. Rather, any of the processing blocks of FIG. 2 may be re-ordered, combined or removed, performed in parallel or in serial, as necessary, to achieve the results set forth above.

The processing blocks (for example, in the process 200) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate. Further, process 200 can be implemented in any combination hardware devices and software components.

While several embodiments have been described herein, those of ordinary skill in the art will recognize that the embodiments are merely examples and can be practiced with modification and alteration within the spirit and scope of the appended claims. In addition, elements of different embodiments described herein may be combined to form other embodiments not specifically set forth above. The description is thus to be regarded as illustrative instead of limiting. There are numerous other variations to different aspects of the embodiments described above, which in the interest of conciseness have not been provided in detail. Accordingly, other embodiments are within the scope of the claims.

The invention claimed is:

1. A method comprising:
    automatically validating a description of defect classifications in a service request, using a keywords validator, wherein the defect classifications are defined using keywords and attributes;
    automatically generating a database SQL (structured query language) query, using an SQL generator, based on the description of defect classifications, wherein the database SQL query:
        classifies case information by problem type;
        assigns the case information to a domain and a component; and
        extracts cost information associated with the service request;
    automatically performing a problem classification analysis, using a keyword analysis engine, by applying the description of defect classifications of the keywords to a result of the database SQL query; and
    automatically performing a cost analysis, using a cost analysis engine, by problem group based at least on the case information associated with cost information and the result of the database SQL query.

2. The method of claim 1 wherein the description of the defect classifications is obtained from a spreadsheet file.

3. The method of claim 1 wherein the description of the defect classifications is defined using keywords and attributes by a user.

4. The method of claim 1 wherein the description of defect classifications is comprised of regular expressions.

5. The method of claim 1 wherein the problem classification analysis results in an analysis results file comprising a summary section showing summary data by problem group, an analysis section showing, for the case information, attributes and problem group along with a matched keyword rule, and a log section showing a number of the case information that matched each keyword rule.

6. The method of claim 1 wherein the description of defect classifications is defined by automatically generating n-grams for unclassified case information to be added to the keywords, wherein the n-grams are generated by analyzing a problem summary and a resolution summary of the unclassified case information for highest frequency n-grams.

7. The method of claim 1 wherein the description of defect classifications is defined by automatically generating coverage analysis for other case information attributes.

8. A case analysis system comprising:
    electronic hardware circuitry constructed to:
    automatically validate a description of defect classifications in a service request, using a keywords validator, wherein the defect classifications are defined using keywords and attributes;
    automatically generate a database SQL (structured query language) query, using an SQL generator, based on the description of defect classifications, wherein the database SQL query:
        classifies the case information by problem type;
        assigns the case information to a domain and a component; and
        extracts cost information associated with the service request;
    automatically perform a problem classification analysis, using a keyword analysis engine, by applying the description of defect classifications of the keywords to a result of the database SQL query; and
    automatically perform a cost analysis, using a cost analysis engine, by problem group based at least on the case information associated with cost information and the result of the database SQL query.

9. The case analysis system of claim 8 wherein the description of the defect classifications is obtained from a spreadsheet file.

10. The case analysis system of claim 8 wherein the description of the defect classifications is defined using keywords and attributes by a user.

11. The case analysis system of claim 8 wherein the description of defect classifications is comprised of regular expressions.

12. The case analysis system of claim 8 wherein the problem classification analysis results in an analysis results file comprising a summary section showing summary data by problem group, an analysis section showing, for the case information, attributes and problem group along with a matched keyword rule, and a log section showing a number of the case information that matched each keyword rule.

13. The case analysis system of claim 8 wherein the description of defect classifications is defined by automatically generating n-grams for unclassified case information to be added to the keywords, wherein the n-grams are generated by analyzing a problem summary and a resolution summary of the unclassified case information for highest frequency n-grams.

14. The case analysis system of claim 8 wherein the description of defect classifications is defined by automatically generating coverage analysis for other case information attributes.

15. A non-transitory computer-readable storage medium storing computer-executable instructions, the instructions causing a machine to execute a process comprising:
- automatically validating a description of defect classifications in a service request, using a keywords validator, wherein the defect classifications are defined using keywords and attributes;
- automatically generating a database SQL (structured query language) query, using an SQL generator, based on the description of defect classifications, wherein the database SQL query:
  - classifies case information by problem type;
  - assigns the case information to a domain and a component; and
  - extracts cost information associated with the service request;
- automatically performing a problem classification analysis, using a keyword analysis engine, by applying the description of defect classifications of the keywords to a result of the database SQL query; and
- automatically performing a cost analysis, using a cost analysis engine, by problem group based at least on the case information associated with cost information and the result of the database SQL query.

16. The non-transitory computer-readable storage medium of claim 15 wherein the description of the defect classifications is obtained from a spreadsheet file.

17. The non-transitory computer-readable storage medium of claim 15 wherein the description of the defect classifications is defined using keywords and attributes by a user.

18. The non-transitory computer-readable storage medium of claim 15 wherein the description of defect classifications is comprised of regular expressions.

19. The non-transitory computer-readable storage medium of claim 15 wherein the problem classification analysis results in an analysis results file comprising a summary section showing summary data by problem group, an analysis section showing, for the case information, attributes and problem group along with a matched keyword rule, and a log section showing a number of the case information that matched each keyword rule.

20. The non-transitory computer-readable storage medium of claim 15 wherein the description of defect classifications is defined by automatically generating n-grams for unclassified case information to be added to the keywords, wherein the n-grams are generated by analyzing a problem summary and a resolution summary of the unclassified case information for highest frequency n-grams.

21. The non-transitory computer-readable storage medium of claim 15 wherein the description of defect classifications is defined by automatically generating coverage analysis for other case information attributes.

* * * * *